United States Patent
Spahlinger et al.

(10) Patent No.: US 10,408,646 B2
(45) Date of Patent: Sep. 10, 2019

(54) METHOD FOR DEFECT DETECTION FOR THE SIGNAL LINE BETWEEN AN ELECTRODE AND A MEASURING- AND/OR EVALUATION UNIT OF A MAGNETO-INDUCTIVE FLOW MEASURING DEVICE

(71) Applicant: Endress + Hauser Flowtec AG, Reinach (CH)

(72) Inventors: Andre Spahlinger, Bad Bellingen (DE); Markus Rufenacht, Therwil (CH); Christophe Boeglin, Wolschwiller (FR)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 122 days.

(21) Appl. No.: 15/537,906

(22) PCT Filed: Dec. 10, 2015

(86) PCT No.: PCT/EP2015/079284
§ 371 (c)(1),
(2) Date: Jun. 20, 2017

(87) PCT Pub. No.: WO2016/102193
PCT Pub. Date: Jun. 30, 2016

(65) Prior Publication Data
US 2017/0343396 A1  Nov. 30, 2017

(30) Foreign Application Priority Data
Dec. 22, 2014 (DE) .......................... 10 2014 119 453

(51) Int. Cl.
*G01F 1/58* (2006.01)
*G01F 1/60* (2006.01)

(52) U.S. Cl.
CPC .............. *G01F 1/588* (2013.01); *G01F 1/584* (2013.01); *G01F 1/586* (2013.01); *G01F 1/60* (2013.01)

(58) Field of Classification Search
CPC ........................................................ G01F 1/584
(Continued)

(56) References Cited

U.S. PATENT DOCUMENTS 5,416,419 A * 5/1995 Witt ...................... G01R 31/022
324/515
6,238,757 B1 5/2001 Knappe
(Continued)

FOREIGN PATENT DOCUMENTS

CN  101487726 A  7/2009
CN  101652638 A  2/2010
(Continued)

OTHER PUBLICATIONS

German Search Report, German Patent Office, Munich, DE, dated Sep. 23, 2015.
(Continued)

*Primary Examiner* — Jewel V Dowtin
(74) *Attorney, Agent, or Firm* — Bacon & Thomas, PLLC

(57) ABSTRACT

A method for defect detection for a signal line between an electrode and a measuring- and/or evaluation unit of a magneto-inductive flow measuring device having at least one measuring- and/or evaluation unit, as well as a measuring tube with at least two measuring electrodes and a third electrode, comprising steps as follows:
A) ascertaining a ratio of at least two measured electrical impedances between the measuring electrodes and/or between at least one of the two measuring electrodes and the third electrode;
B) comparing the impedance ratio with a desired value range and
(Continued)

C) outputting a defect report, when the impedance ratio exceeds or subceeds the desired value range, and a magneto-inductive flow measuring device.

7 Claims, 2 Drawing Sheets

(58) Field of Classification Search
USPC .................................................. 73/861.12
See application file for complete search history.

(56) References Cited

U.S. PATENT DOCUMENTS

| | | | |
|---|---|---|---|
| 6,392,416 | B1 | 5/2002 | Keech |
| 6,697,742 | B1 | 2/2004 | Franklin |
| 6,804,613 | B2 | 10/2004 | Ishikawa |
| 7,508,222 | B2 * | 3/2009 | Asquith .................... G01F 1/60 324/664 |
| 7,546,212 | B2 | 6/2009 | Schrag |
| 7,845,238 | B2 | 12/2010 | Ruchel |
| 7,971,493 | B2 | 7/2011 | Hencken |
| 8,046,194 | B2 | 10/2011 | Rufer |
| 2002/0050175 | A1 | 5/2002 | Feller |
| 2004/0235975 | A1 | 11/2004 | Suhadolnik |
| 2010/0122582 | A1 | 5/2010 | Hencken |
| 2011/0102809 | A1 * | 5/2011 | Moon .................... G01B 7/003 356/614 |
| 2014/0315016 | A1 | 10/2014 | Dollase |
| 2017/0131131 | A1 * | 5/2017 | Keech .................... G01F 1/588 |
| 2017/0343396 | A1 | 11/2017 | Spahlinger |

FOREIGN PATENT DOCUMENTS

| | | | |
|---|---|---|---|
| CN | 101769770 | A | 7/2010 |
| DE | 4120858 | A1 | 1/1993 |
| DE | 10243748 | A1 | 4/2003 |
| DE | 102005044972 | A1 | 3/2007 |
| DE | 102006033112 | A1 | 1/2008 |
| DE | 102007014469 | A1 | 9/2008 |
| DE | 102007037166 | A1 | 2/2009 |
| DE | 102008005258 | A1 | 7/2009 |
| DE | 102012202377 | A1 | 4/2013 |
| DE | 102014119453 | A1 | 6/2016 |
| GB | 2309308 | A | 7/1997 |
| GB | 2333161 | A | 7/1999 |
| GB | 2333161 | A * | 7/1999 ............. G01F 5/584 |
| JP | 2012078280 | A | 4/2012 |
| WO | 2007033901 | A1 | 3/2007 |

OTHER PUBLICATIONS

International Search Report, EPO, The Netherlands, dated Apr. 22, 2016.
English Translation of the International Preliminary Report on Patentability, WIPO, Geneva, CH, dated Jul. 6, 2017.
Chinese Office Action in corresponding Chinese Application No. 201580069897.6, dated Feb. 19, 2019.

* cited by examiner

METHOD FOR DEFECT DETECTION FOR THE SIGNAL LINE BETWEEN AN ELECTRODE AND A MEASURING- AND/OR EVALUATION UNIT OF A MAGNETO-INDUCTIVE FLOW MEASURING DEVICE

TECHNICAL FIELD

The present invention relates to a method for defect detection for a signal line between an electrode and a measuring- and/or evaluation unit of a magneto-inductive flow measuring device as well as to a magneto-inductive flow measuring device.

BACKGROUND OF THE INVENTION

Known from the state of the art are a series of impedance measuring methods and their use in the field of magneto-inductive flow measurement. Relevant in this connection are, among others, EP 2 245 430 A2 and DE 10 2006 033 112 A1. Usually, the impedance measurements are utilized in order to determine fill level or, in given cases, and to detect a deposit on or corrosion of the measuring electrodes.

It can in the life cycle of a magneto-inductive flow measuring device in process measurements technology, however, occur that individual sensor components stop working. While checking functions and monitoring functionalities for magnet systems or also for the connection between magnet system and transmitter are already known, monitoring of the signal line between individual electrodes, especially the measuring electrodes, and the transmitter for a defect has not previously been performed.

SUMMARY OF THE INVENTION

An object of the present invention is, consequently, to provide defect detection for a signal line between an electrode and a measuring- and/or evaluation unit in a magneto-inductive measuring device.

The present invention differentiates between defect detection and a faulty measurement. While a faulty measurement only yields one defective measured value, of concern in the case of defect detection is that the device no longer delivers informative measured values. In the case of a faulty measurement, thus, an error burdened result can still be evaluated, while in the case of a defect no measured value results or a completely unrealistic measured value is delivered.

A defect is present especially in the case that a conductive line to the measuring electrode is broken. In such case, voltage can no longer be sensed. In the context of a failure diagnosis, then the measuring device can check, whether the defect is due to an interruption of the signal line of the measuring electrode, e.g. due to a signal line break or due to release of the soldered connection. Of concern in the case of the defect detection is whether an interruption is present between the electrodes of the magneto-inductive flow measuring device and the measuring- and/or evaluation unit.

According to the invention, a method for defect detection for a signal line between an electrode and a measuring- and/or evaluation unit of a magneto-inductive flow measuring device having at least one measuring- and/or evaluation unit, as well as a measuring tube with at least two measuring electrodes and a third electrode, comprises steps as follows:

A) ascertaining a ratio of at least two measured electrical impedances between the measuring electrodes and/or between at least one of the two measuring electrodes and the third electrode;

B) comparing the impedance ratio with a desired value range, and

C) outputting a defect report, when the impedance ratio exceeds or subceeds the desired value range.

The desired value range ddpends especially on the geometric arrangement of the electrodes relative to one another and which measuring paths are being compared.

Advantageous embodiments of the invention are subject matter of the dependent claims.

Advantageously, the desired value range lies between 0.2 and 5.0, especially between 0.5 and 2.0. These are especially appropriate, when the electrode arrangement is arranged symmetrically in the measuring tube. With these values, one can safely assume that deposits on the electrodes or flow disturbances are not triggering the defect report.

Advantageously, the defect report indicates a signal line break, when the highest one of the impedances trends approximately toward infinity. In the case of an empty measuring tube, no defect report is signaled thereby.

Advantageously, the measuring of the impedances according to step A occurs by applying a voltage with at least one frequency, especially a number of frequencies, to a preresistor on a measuring path composed of two of the aforementioned electrodes. In this way, no special electrical current feed is necessary and an uncomplicated measuring is enabled.

Advantageously, the third electrode is a ground electrode, by means of which a potential equilibration of the measured medium guided in the measuring tube with the environment is effected. In the case of most magneto-inductive flow measuring devices, a ground electrode is provided according to standard. Thus, no additional equipment (e.g. electrodes or circuit components) is required for putting the defect detection into practice.

Alternatively or supplementally, the third electrode can advantageously be embodied as an EPD electrode, by means of which the complete filling of the measuring tube with measured medium is monitored during the measuring. Measuring via an EPD electrode is especially advantageous in the case of flow measuring devices, where no ground electrode is provided. Also in this case, no additional equipment is required for performing the defect detection.

It is especially advantageous, when impedance ratios of at least three impedance measurements between each of the measuring electrodes and the third electrode, as well as, in given cases, additional electrodes, are ascertained and compared with the desired value range. A signal line break, or, in general, a defect, can already be detected by ascertaining two impedances in the case of an arrangement of three electrodes, thus the measuring electrodes and the third electrode. Problematic is when a signal line break to the electrode happens, which enters both into the first as well as also into the second impedance measurement. Here, in the case of signal line break, the two measured impedances would trend toward infinity and in the case of ratio formation cancel one another out. In this case, the measuring of the third impedance of the arrangement and the following ratio formation with this third impedance can lead to defect formation.

It is advantageous, when the magneto-inductive flow measuring device has a fourth electrode, especially an EPD electrode or a ground electrode. This gives the device more comparison measuring paths to check for a signal line break.

The magneto-inductive flow measuring device can especially advantageously have at least two measuring electrodes, an EPD electrode and a ground electrode and the impedances between all four electrodes are measured and evaluated by ratio formation and reconciliation with the desired value range.

A magneto-inductive flow measuring device of the invention includes an operating mode, which works according to a method as defined in claim 1.

BRIEF DESCRIPTION OF THE DRAWINGS

The invention will now be explained in greater detail based on the appended drawing illustrating examples of embodiments. The figures of the drawing show as follows.

DETAILED DISCUSSION IN CONJUNCTION WITH THE DRAWINGS

The measuring principle of a magneto-inductive flow measuring device is basically known. In Faraday's law of induction, a voltage is induced in a conductor, which moves in a magnetic field. In the case of the magneto-inductive measuring principle, flowing measured medium corresponds to the moved conductor.

Figure 1:
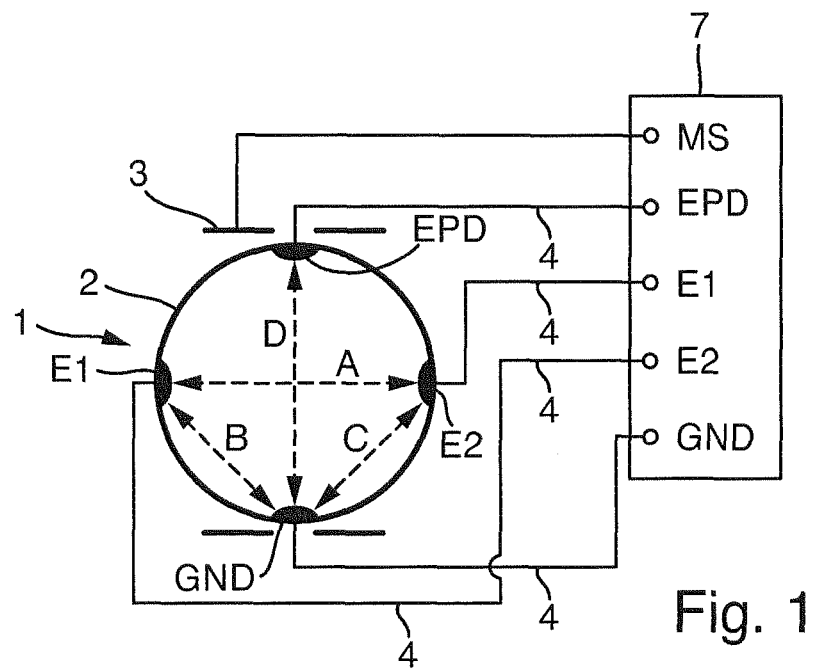
FIG. 1 a schematic representation of a magneto-inductive flow measuring device.

FIG. 1 shows the schematic construction of a preferred embodiment of a magneto-inductive flow measuring device 1 of the invention. It includes a measuring tube 2 and two field coils 3, which are arranged diametrally relative to one another at or in the measuring tube 2 and produce a magnetic field. Also more than two magnetic field producing elements, e.g. four field coils, can be provided.

Additionally provided at the measuring tube 2 arranged diametrally relative to one another are two measuring electrodes E1, E2, which in the case of an arrangement of two field coils are preferably arranged on the measuring tube offset by 90° relative to the fields coils. The measuring electrodes E1, E2 sense the voltage produced by the measured substance, or measured medium, as it flows through the measuring tube. The induced voltage is proportional to the flow velocity and therewith also to the volume flow. The magnetic field coming from the field coils 3 is preferably produced by a clocked, direct current of changing polarity. This assures a stable zero-point and makes the measuring insensitive to influences of multiphase materials, inhomogeneities in the liquid or low conductivity.

In addition to the two measuring electrodes E1, E2, a magneto-inductive flow measuring device 1 can have a ground electrode GND and/or another electrode EPD, which is often called the MSM electrode (measured substance monitoring electrode), the fill level monitoring electrode or the EPD electrode (empty pipe detection electrode). Both of these extra electrodes are known from the state of the art. The EPD electrode monitors, in such case, whether the measuring tube is completely filled during the measuring. This occurs preferably by a measuring of conductivity.

The magneto-inductive flow measuring device 1 shown in FIG. 1 also includes at least one EPD electrode EPD for monitoring the fill state of the measuring tube 2 and at least one ground electrode GND.

Known are also design variants of a magneto-inductive flow measuring device, in which only an EPD electrode EPD or only a ground electrode GND is used. These are likewise included in the subject matter of the present invention.

The measured values and/or the states of the individual electrodes are evaluated and/or monitored by a measuring- and/or evaluation unit 7.

Arranged between the measuring- and/or evaluation unit 7 and the measuring electrodes E1, E2, the EPD electrode EPD and the ground electrode GND is, in each case, a conductive line 4, which transmits measurement signals to the measuring- and/or evaluation unit 7 or to a wireless transmitting unit, which transmits measurement signals to the measuring- and evaluation unit 7. In all cases, of concern is a signal line in the sense of the present invention, even when a part of this signal line occurs wirelessly.

Figure 2:
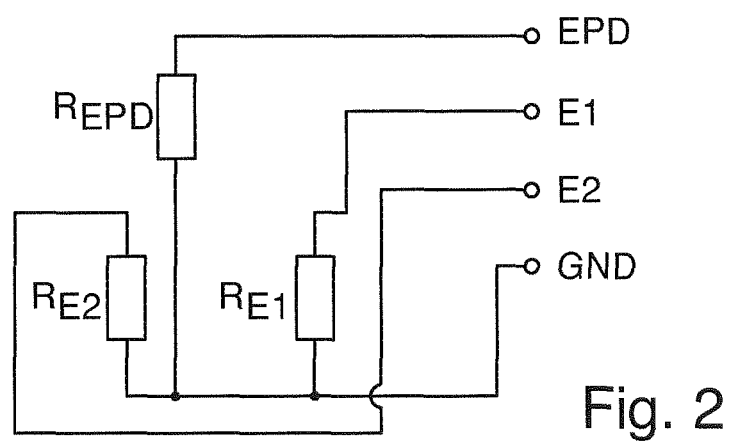
FIG. 2 a schematic circuit diagram showing impedances between individual electrodes.

FIG. 2 shows in simple manner the basic idea of the present invention. The evaluation can be done, in principle, with the two measuring electrodes and any third electrode. In the case of filled measuring tube, e.g. the impedances $R_{E2}$, $R_{E1}$ and $R_{EPD}$ can be measured on the measuring electrodes E1 and E2 and on the EPD electrode against the ground electrode GND. These impedances are, among other things, dependent on the measured medium, the electrode form, the electrode material and also on the measuring path between the respective electrodes. Particularly also the geometric arrangement of the electrodes is to be taken into consideration.

Shown in FIG. 1 are a number of measuring paths A, B, C and D between the measuring electrodes, EPD electrode and the ground electrode. An electrode arrangement is symmetric in the sense of the present invention, when the shortest distance B of an electrode to the next neighboring electrode is equal in magnitude to a distance C of this next neighboring electrode to an additional electrode.

Henceforth for simplification, only impedances will be discussed; it is recognized that the explanations could, however, be provided based on conductances. The ratio of $R_{EPD}$ to $R_{E1}$, $R_{E2}$ or $R_{E1} \| R_{E2}$ is independent of the medium due to the geometric arrangement of the electrodes, thus the measuring electrodes $E_1$, $E_2$ and the EPD electrode to the ground electrode GND. As one can see in FIG. 1, the measuring paths B and C of the GND electrode to a respective measuring electrode E1 or E2 are clearly smaller than the separation A between the two measuring electrodes E1 and E2. The ratio of the impedances $R_{E1}$ to $R_{E2}$, thus the impedances via the measuring paths B and C, can be taken into consideration for detecting a break of the signal lines. Since the two measuring paths are equally large and the electrode types are likewise equally embodied, the ratio of the impedances $R_{E1}/R_{E2}$ is in the ideal case 1.0. Often, in the real case, however, deposits on the electrodes, flow disturbances and the like influence the ratio.

In the case of a malfunction, the impedance on the defective electrode can be very large or approximately infinitely large. Smaller impedance differences, which lie outside of the predefined reference value, can indicate a defect due to strong accretion or an asymmetric accretion on the electrodes.

Since, thus, in the case of a signal line break, the impedance $R_{E1}$ or $R_{E2}$ tends toward infinity, even high limit values e.g. of 0.2 or of 5.0 for an impedance ratio are easily exceeded.

When the impedances $R_{E1}$ to $R_{E2}$ are not located in the desired value range relative to one another typical for the sensor, a signal line break is present. The principle can also be applied, when the distances B and C are not equal.

The terminology, signal line break, means in the context of the invention also a signal line break e.g. at the solder location for the corresponding electrode.

Problematic in the case of a comparison of a ratio of only two impedances is that the two compared impedances are measured through measuring paths from two electrodes, in the concrete case the measuring electrodes $E_1$ and $E_2$, to a common electrode, in the concrete case the ground electrode GND. If there occurs, thus, a signal line break on the signal line of the GND electrode, then, since the two impedance values trend toward infinity, the ratio of the impedances is again approximately 1 and the measuring device thinks there is no reason to display a signal line break.

Therefore, in an especially preferred embodiment, a checking of the ratios of the impedances on the measuring paths A, B and C should be done. If one of the ratios of the impedances lies outside of the desired value range, then a signal line break is present.

It is problematic further, when a measuring tube is only partially filled. In this case, a signal line defect would also be displayed. Here, an EPD electrode is used, in order to display the degree of filling of the measuring tube.

Additionally, one or more impedances between the EPD electrode and the ground electrode GND or one or all of the measuring electrodes E1, E2 are measured and their ratios formed and reconciled with predefined desired value ranges. In this way, also a verification of a signal line break can occur using the EPD electrode.

Figure 3:
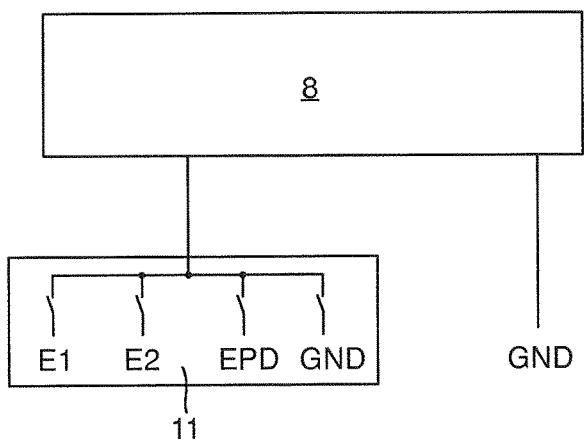
FIG. 3 a first schematic circuit diagram showing circuitry for ascertaining impedance between two electrodes.
Figure 4:
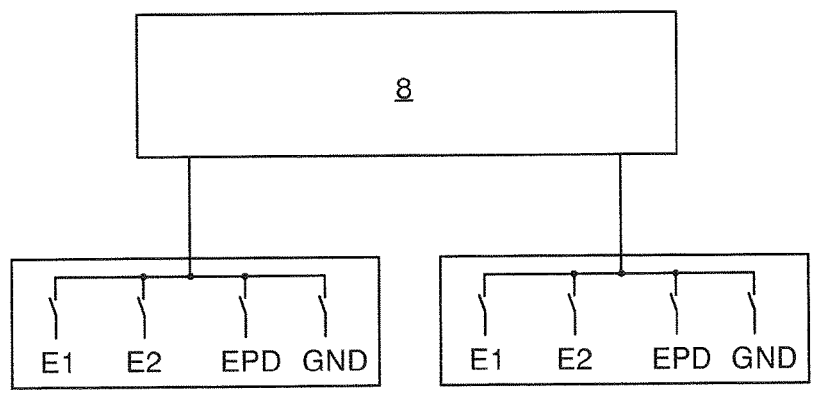
FIG. 4 a second schematic circuit diagram showing circuitry for ascertaining impedance between two electrodes.

The determining of the impedances is performed by a per se known circuit of the EPD electrode or the GND electrode, either of which is, in most cases, already present in the magneto inductive flow measuring device. In given cases, switches are required, in order that the impedances of the individual electrodes can be measured. Switch arrangements are shown in FIGS. 3 and 4. In such cases, it is assumed that the impedance is always determined against the ground, or earth, potential. This is, however, not absolutely required.

The invention relates to no particular measurement circuit, but, instead, to the evaluation of the, most often, already present measured values, i.e. the impedances.

The comparison of the individual impedances serves for detecting whether a malfunction of the measuring electrodes, EPD electrode and/or, in given cases, the ground electrode is present. Therewith, the device can automatically perform a self-test, whether damage to these components is present. This can be registered continuously with existing hardware. The measuring- and evaluation unit 7 compares, in such case, the ratio $R_{EPD}/(R_{E1} \| R_{E2})$ with a reference value. If a deviation occurs, this is displayed as a signal line break. Since this detection functions especially with filled measuring tube, such is preferably only performed when the EPD electrode is sensing a full measuring tube.

Since most magneto-inductive flow measuring devices already are provided with corresponding electrode arrangements and circuit arrangements, an existing device can be retrofitted also with the above-described functionality of an electrode self check by a corresponding software update.

FIG. 3 shows a possible circuit, in which impedances between all electrodes 11 of the magneto-inductive flow measuring device FIG. 1 and the ground electrode GND are being compared. For such purpose, a usual measurement circuit for determining impedances is used.

It is, however, also possible to ascertain and to compare any first impedance and any second impedance on measuring paths between E1, E2, EPD and/or GND by means of the measurement circuit 8. This is shown in FIG. 4.

Figure 5:
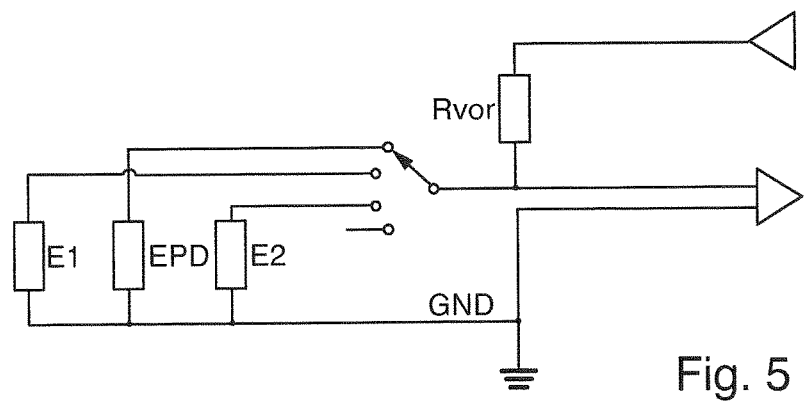
FIG. 5 a simplified schematic circuit diagram showing circuitry options for ascertaining impedance between any electrode and a ground electrode.

FIG. 5 shows a simplified circuit arrangement of a preferred embodiment. The circuit arrangement is supplied with a voltage. This can have one frequency, preferably, however, a number of frequencies, especially three frequencies.

The voltage is led via a preresistor $R_{pre}$ to one of the electrodes E1, E2, GND or EPD. The impedance is in the case FIG. 5 always ascertained relative to the ground electrode GND. The measuring path for ascertaining the impedance is thus the path between the ground electrode GND and one of the electrodes E1, E2 or EPD. Then, two of these impedances are converted into a ratio, which is compared with a reference value.

REFERENCE CHARACTERS 1 magneto inductive flow measuring device
2 measuring tube
3 field coil
4 signal line, or conductive line
8 measurement circuit
11 electrodes
E1 measuring electrode
E2 measuring electrode
GND ground electrode
EPD fill level monitoring electrode
$R_{E1}$ impedance from E1 to GND
$R_{E2}$ impedance from E2 to GND
$R_{EPD}$ impedance from EPD to GND
$R_{pre}$ preresistor

The invention claimed is:

1. Method for defect detection for a signal line between an electrode and a measuring and/or evaluation unit of a magneto-inductive flow measuring device having at least one measuring and/or evaluation unit, as well as a measuring tube with at least two measuring electrodes and a third electrode, wherein the third electrode is an EPD electrode, by means of which complete filling of the measuring tube with a measured medium is monitored during the measuring, comprising steps as follows:
    A) ascertaining a ratio of at least two measured electrical impedances, a first of the two measured electrical impedances being between the measuring electrodes and a second of the two measured impedances being between at least one of the two measuring electrodes and the EPD electrode,
       wherein the measuring of the impedances occurs by applying a voltage with a plurality of frequencies to a preresistor on a measuring path composed of two of the measuring electrodes and to a measuring path composed of at least one of the measuring electrodes and the EPD electrode;
    B) comparing a ratio of the electrical impedances measured in step A with a desired value range, and
    C) outputting a defect report when the impedance ratio exceeds or subceeds the desired value range.

2. Method for defect detection as claimed in claim 1, wherein the desired value range lies between 0.2 and 5.0.

3. Method for defect detection as claimed in claim 1, wherein the defect report indicates a signal line break when the highest one of the impedances trends approximately toward infinity.

4. Method for defect detection as claimed in claim 1, wherein impedance ratios of at least three measured impedances between each of the measuring electrodes and the EPD electrode are ascertained and compared with the desired value range.

5. Method for defect detection as claimed in claim 1, wherein the magneto-inductive flow measuring device has a ground electrode.

6. Method for defect detection as claimed in claim 1, wherein the magneto-inductive flow measuring device further includes a ground electrode and at least three impedances between, in each case, one of three of the two measuring electrodes, the EPD electrode, and the ground electrode are measured and evaluated by ratio formation and reconciliation with the desired value range.

7. Method for defect detection as claimed in claim 1, wherein the magneto-inductive flow measuring device includes an operating mode for performing steps A, B, and C.

* * * * *